United States Patent
Gruhlke et al.

(10) Patent No.: US 7,557,338 B2
(45) Date of Patent: Jul. 7, 2009

(54) ELECTRONIC DEVICE WITH INTEGRATED OPTICAL NAVIGATION MODULE AND MICROLENS ARRAY THEREFORE

(75) Inventors: Russell W. Gruhlke, Fort Collins, CO (US); Rene P. Helbing, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 28 days.

(21) Appl. No.: 11/374,052

(22) Filed: Mar. 14, 2006

(65) Prior Publication Data

US 2007/0215793 A1    Sep. 20, 2007

(51) Int. Cl.
*G06M 7/00* (2006.01)
*H01J 40/14* (2006.01)

(52) U.S. Cl. ............... 250/221; 345/166; 345/175
(58) Field of Classification Search ............ 250/221; 345/166, 175

See application file for complete search history.

(56) References Cited

U.S. PATENT DOCUMENTS

| | | | | |
|---|---|---|---|---|
| 4,409,479 A | * | 10/1983 | Sprague et al. | 250/237 G |
| 5,610,390 A | * | 3/1997 | Miyano | 250/216 |
| 5,644,139 A | | 7/1997 | Allen et al. | |
| 5,726,443 A | * | 3/1998 | Immega et al. | 250/227.2 |
| 5,870,224 A | | 2/1999 | Saitoh et al. | |
| 6,256,016 B1 | * | 7/2001 | Piot et al. | 345/166 |
| 6,281,882 B1 | | 8/2001 | Gordon et al. | |
| 6,518,640 B2 | * | 2/2003 | Suzuki et al. | 257/432 |
| 6,707,027 B2 | * | 3/2004 | Liess et al. | 250/221 |
| 6,809,723 B2 | * | 10/2004 | Davis | 345/166 |
| 7,129,502 B2 | * | 10/2006 | Kruit | 250/396 R |
| 2004/0208347 A1 | * | 10/2004 | Baharav et al. | 382/124 |
| 2004/0208348 A1 | | 10/2004 | Baharav | |
| 2005/0151148 A1 | * | 7/2005 | Raynor | 257/98 |
| 2006/0255286 A1 | * | 11/2006 | Kim | 250/396 ML |

FOREIGN PATENT DOCUMENTS

WO    WO 00/64146    10/2000

OTHER PUBLICATIONS

Agilent ADNK-2133: Optical Mouse Designer's Kit—Product Overview (pp. 1-6), www.agilent.com/semiconductors, Copyright 2004 Agilent Technologies, Inc., May 26, 2004.
Teo Chiang Mei, "Understanding Optical Mice: White Paper" (pp. 1-8), www.agilent.com/semiconductors, Copyright 2004 Agilent Technologies, Inc., Sep. 14, 2005.
Agilent ADNK-3043-ND24: USB 2.4GHz RF Wireless Low-Power Mouse Designer's Kit—Product Overview (pp. 1-6), www.agilent.com/semiconductors, Copyright 2005 Agilent Technologies, Inc., Oct. 6, 2005.

* cited by examiner

*Primary Examiner*—Seung C Sohn

(57) ABSTRACT

A portable device includes a transparent surface; a microlens array having lenslets, each lenslet forming a corresponding image of an object using light received through the transparent surface; a light sensor having pixels, each pixel corresponding uniquely to one of the plurality of lenslets, to detect the formed images of the object; and a controller to use the detected images to determine a motion of the object relative to the transparent surface, and to output the detected motion to a display for use in navigating a cursor and/or a menu on the display according to the determined motion. The portable device can be used in a telephone, personal digital assistant, and/or other handheld devices which control navigation on a display included in the device or external to the device.

20 Claims, 7 Drawing Sheets

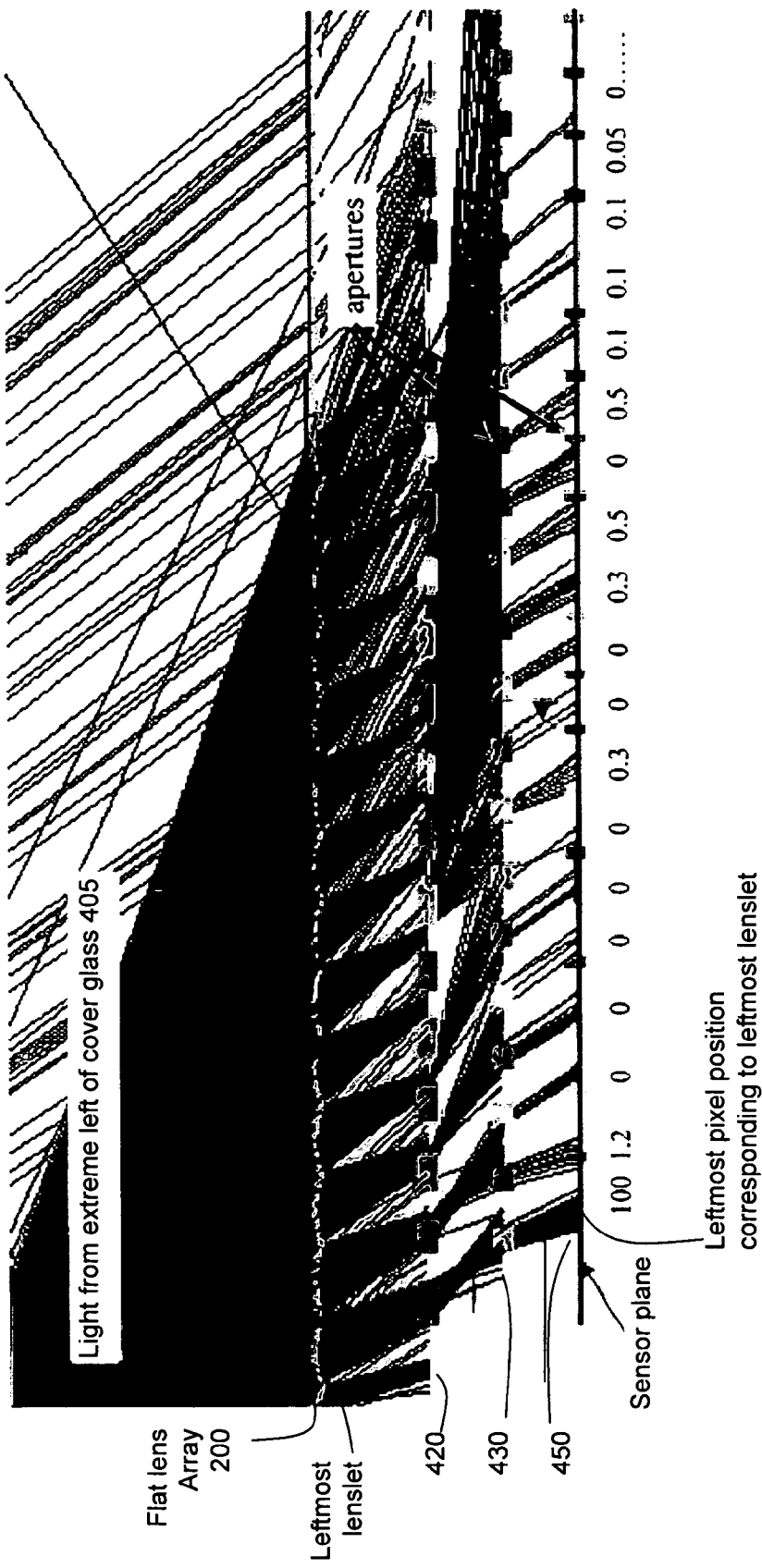

ELECTRONIC DEVICE WITH INTEGRATED OPTICAL NAVIGATION MODULE AND MICROLENS ARRAY THEREFORE

BACKGROUND OF THE INVENTION

1. Field of the Invention

Aspects of the invention relate to optical navigation using a microlens array, and more particularly, to an electronic device having an integrated optical navigation module using a flat-type microlens array.

2. Description of the Related Art

Conventionally, navigation modules (i.e., computer mice) come in a wide variety of shapes having different features, sizes and prices. Navigation modules are categorized according to how the motion is sensed. Specifically, optical navigation modules use optical motion sensing. In contrast, mechanical navigation modules use mechanical motion sensing. While the mechanical mice were the earlier of the two types of navigation modules, the optical navigation modules have begun to gain increased acceptance.

Early versions of optical navigation modules were used in the context of personal computers and relied upon fine lines on a specific grid in order to perform tracking operations. However, with the advent of an optical position sensor by Agilent Technologies in 1999, optical mice are now able to work on a wide variety of surfaces without requiring the fine line grids. The optical position sensor works by taking a picture of the surface on which the mouse is navigating, and comparing images taken sequentially to detect the speed and direction of the movement of the surface relative to the mouse. In this manner, the optical mouse is able to navigate across a wide variety of surfaces without requiring such a grid.

In contrast to early optical mice and mechanical mice which used a ball to perform the tracking operation, an optical mouse typically does not use a ball. Specifically, the mouse includes a clear lens underneath. Light from a light source (generally an LED emitting a red wavelength light) reflects off the surface and is received through a window at the lens. The lens focuses the received light on a sensor, which detects the image. As such, as the mouse is moved, the sensor takes continuous images of the surface and compares the images to determine the distance and direction traveled utilizing digital signal processing. The comparison results are then sent to a personal computer in order to move the cursor on the screen.

With the emergence of increasing numbers of handheld electronic devices, such as cell phones and PDAs, with small displays and increased functionality, there is an increased need for more flexible and sophisticated navigation technologies to allow the user to easily access this functionality. However, while optical mice are used with computers, optical navigation modules are not used for these handheld devices. This is because computers are of a larger scale and are expected to use external optical mice on a desk in order to navigate on a screen. In contrast, handheld devices have a constrained size so as to fit in the hand and/or pocket. Thus, handheld devices are not typically used with external devices to perform on-screen navigation, making the inclusion of conventional optical navigation technologies impractical with the handheld devices.

Instead, conventional handheld devices, such as cell phones and personal digital assistants (PDAs), use mechanical navigation devices to perform on screen navigation. Examples of mechanical navigation devices include a button, rocker switch, a click wheel, and/or touch screen displays. As such, when a user needs to select an item or navigate through an on screen menu, the user presses the button, rocker switch and/or presses (such as with a stylus) the screen itself.

However, such mechanical devices have drawbacks in terms of overall aesthetic appeal, are liable to wear out from prolonged use, and are limited in terms of the navigation directions. For instance, on a cell phone using the rocker switch, the rocker switch is under a circular disk and typically allows navigation in one of four directions (i.e., up/down and left/right). As such, when pressed by the user, the user can only navigate in one of the four directions. Therefore, in order to increase range of on screen movement, there need to be increased numbers of switches, which increases the complexity of the navigation module and exacerbates space constraints in a typical hand held device. Thus, existing rocker switch technology is not suitable for providing cursor movement similar to that performed on computers using mice.

For other technologies such as that used in BLACKBERRIES and IPODs, a mounted track wheel is used to allow rapid up-down cursor navigation. However, the track wheel allows only one dimensional movement, and does not allow left-right (i.e., two dimensional) navigation.

Moreover, mechanical devices such as buttons, rocker switches and sidewalls have drawbacks in terms of overall aesthetic appeal, and are liable to wear out from prolonged use.

Additionally, while touch screen technology allows increased cursor motion, the user is typically is forced to obstruct the display itself to perform navigation. While suitable for desktop computer screens, this obstruction is problematic for small displays. Thus, when used in a handheld device such as a PDA, a separate stylus is often used for increased cursor movement accuracy. The use of the stylus has drawbacks in that the stylus is easy to misplace, aggravating the user. Moreover, unless a stylus is used, the display is likely to become dirty as users touch the display to navigate thereon. Thus, touch screen technology also has limitations when used in the context of navigating cursors.

SUMMARY OF THE INVENTION

Aspects of the invention relate to optical navigation using a microlens array, and more particularly, to a portable electronic device having an optical navigation module using a flat type microlens array.

Additional aspects and/or advantages of the invention will be set forth in part in the description which follows and, in part, will be obvious from the description, or may be learned by practice of the invention.

According to an aspect of the invention, a portable device comprises a display on which information and/or images are displayed; a transparent surface; one or more lenses forming a corresponding image of an object using light received through the transparent surface; a light sensor comprising a plurality of pixels to detect the formed image of the object; and a controller to use the detected image to determine a motion of the object relative to the transparent surface, and to navigate a cursor and/or a menu on the display according to the determined motion.

According to an aspect of the invention, the portable device further comprises a housing on which the display and the transparent surface are mounted and having a cavity housing the one or more lenses, the light sensor, and the controller.

According to an aspect of the invention, the portable device comprises a handheld device, and the housing is shaped to be held in one hand.

According to an aspect of the invention, the object is a fingertip, and the detected motion corresponds to a motion of the fingertip relative to the transparent surface.

According to an aspect of the invention, the portable device further comprises an aperture array between the one or more lenses and the light sensor which blocks portions of the light to prevent the portions from being received at a non-corresponding pixel.

According to an aspect of the invention, each portion of the one or more lenses corresponds to one of the pixels and directs a portion of the image to the corresponding pixel, and the aperture array blocks the portions of the image portion directed to the non-corresponding pixel.

According to an aspect of the invention, a distance between the transparent surface and the sensor is substantially 1 mm.

According to an aspect of the invention, the portable device further comprises a light source directed to the object and which is used by the light sensor to detect the formed image of the object.

According to an aspect of the invention, the light source comprises an LED.

According to an aspect of the invention, the light source comprises a laser which produces an interference pattern using the object used to produce the image of the object.

According to an aspect of the invention, a portable device comprises a transparent surface; a microlens array comprising a plurality of lenslets, each lenslet forming a corresponding image of an object using light received through the transparent surface; a light sensor comprising a plurality of pixels, each pixel corresponding uniquely to one of the plurality of lenslets, to detect the formed images of the object; and a controller to use the detected images to determine a motion of the object relative to the transparent surface, and to output the detected motion to a display for use in navigating a cursor and/or a menu on the display according to the determined motion.

According to an aspect of the invention, the portable device further comprises a display.

According to an aspect of the invention, the sensor is disposed substantially 1 mm from the transparent surface.

According to an aspect of the invention, the portable device further comprises a light source directed to the object and which is used by the light sensor to detect the formed image of the object.

According to an aspect of the invention, the microlens array is directly bonded to the light sensor according to a resist reflow process or injection molding process.

According to an aspect of the invention, the microlens array further comprises an aperture system which blocks portions of light from non-corresponding lenslets so as to prevent the portions from being received on a same pixel.

According to an aspect of the invention, each lenslet forms the corresponding image of the surface on the corresponding pixel at a corresponding offset from a centerline of the lenslet, and an amount of the offset varies as a function of distance from an edge of the light sensor.

According to an aspect of the invention, each lenslet has a diameter, the diameter is in a range at or between 5 to 200 microns, and a height of the microlens array is in a range at or between 5 to 500 microns.

According to an aspect of the invention, each lenslet corresponds to one of the pixels, and a number of pixels of the light sensor is in a range at or between 50 to 2,000 pixels.

According to an aspect of the invention, the portable device comprises a telephone having the display.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a result of a computer simulation of an example of the optical navigation module of FIG. 4 showing amounts of light imaged by a single lenslet and which is received at a corresponding pixel relative to non-corresponding pixels;

DETAILED DESCRIPTION OF THE EMBODIMENTS

Figure 1:
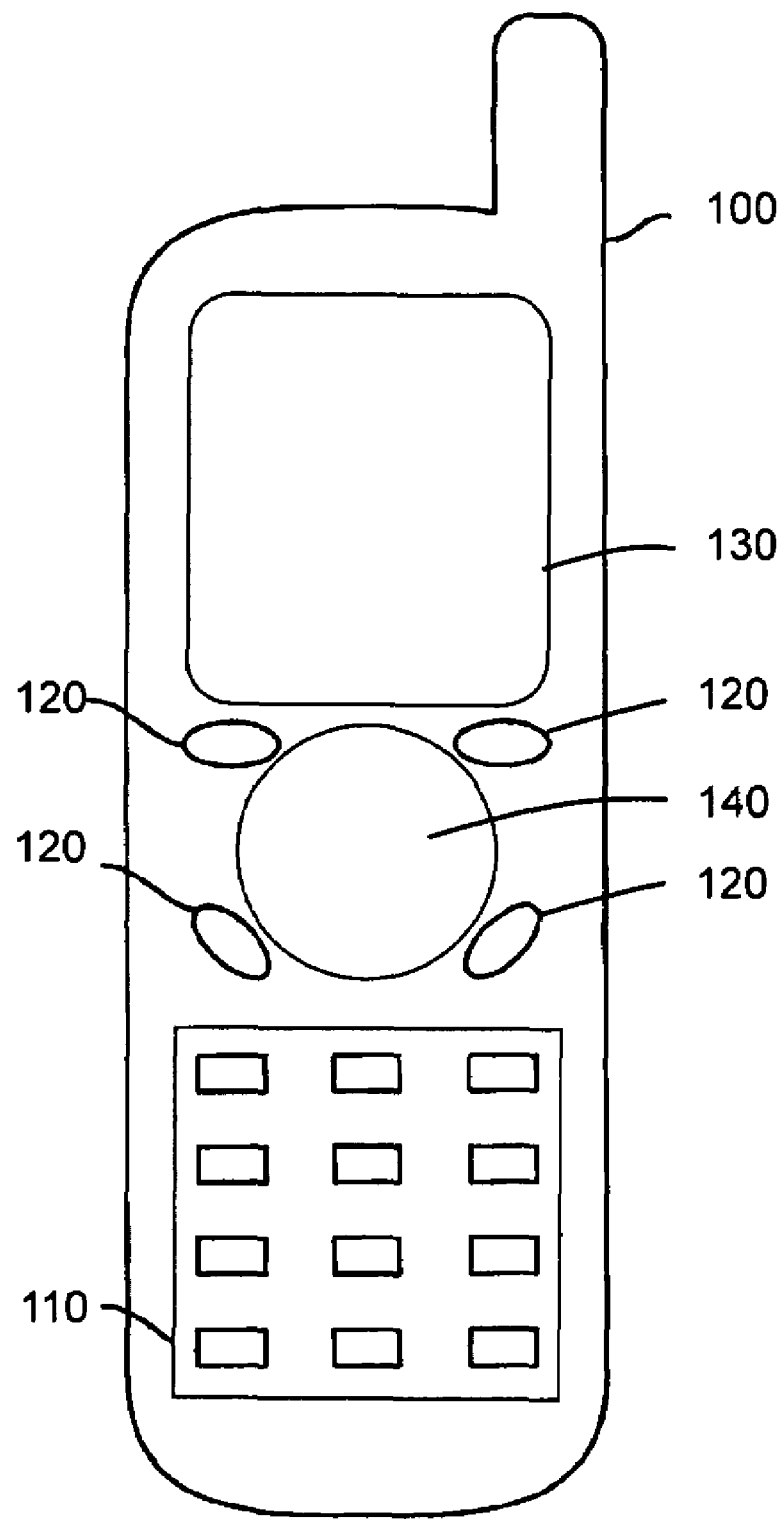
FIG. 1 is a portable telephone having an optical navigation module according to an embodiment of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a phone 100 utilizing an optical navigation device 140 according to an aspect of the invention. The phone 100 is shown as a cellular phone, but may be a wired or wireless phone in other aspects. The phone 100 includes a primary keypad 110, including alphanumeric and other like keys for use and entering numbers and/or characters. The phone 100 includes specific function keys 120 which provide specific functionalities such as send, end-call, and other like commands. Above the specific function keys 120 is a display 130. The display 130 displays information relevant to the user, and can include preset images and video received at the phone 100.

The display 130 can be any type of display, such as an OLED or LCD type display. Moreover, the phone 100 can be of a clam shell design, in which the display 130 is on a separate half of the phone 100 as compared to the primary keypad 110 and/or keys 120, and/or can be supplemented by an exterior display (not shown). Moreover, the phone 100 is merely one example of a hand-held device utilizing an optical navigation device 140. Other examples of such a device include personal digital assistants (PDAs), Smartphones, and Blackberry type communication devices. Moreover, while describing the context of a portable phone 100, it is understood that the optical navigation device can be used in MP3 and other multi-media type players and recorders, such as an IPOD. Moreover, the optical navigation device 140 could be implemented using cameras and camcorders in order to navigate through screens and menus on the display 130, and can also be used for remote controls and hand-held devices such as wireless game controllers and/or remote controllers. For these hand-held computer devices, the display 130 may not be included on the hand-held device itself and instead may be in communication with the optical navigation device 140 and other aspects of the invention.

The optical navigation device 140 shown in FIG. 1 is a circular embodiment. However, it is understood that the device 140 can be other shapes, such as rectangular. Moreover, while shown in FIG. 1 as being on the front of the phone 100 between keys 120 and above the keypad 110, the optical navigation device 140 could instead be on the back or side, on the outside of a clam shell, or as part of a separate flip-out from the phone 100.

The operation of the optical navigation device 140 will be explained in relation to FIGS. 2A through 4 according to aspects of the invention. As shown in FIG. 4, optical navigation is performed through the use of a finger 400 moving across a cover glass 405. This movement allows for detection of the finger 400 motion within the plane of the cover glass 405. However, it is understood that it might be possible to detect motion out of plane of the cover glass 405 in other aspects of the invention in order to further increase the ability to interact with the phone 100 through the device 140.

When the finger 400 is on the cover glass 405, an image of the finger 400 is detected at a sensor array 210 using a flat lens array 200. The sensor array 210 includes sensor pixels 215. Each pixel 215 of the sensor array 210 receives a corresponding image from one of the microlenses 201 through 207 of the flat lens array 200. The sensor array 210 can be a conventional CMOS image sensor or a CCD sensor according to aspects of the invention.

The images from the pixels detected at the sensor array 210 are detected by a chip (not shown). The chip performs a comparative analysis over time of successive images in order to determine a direction and speed of the movement of the finger 400 relative to the cover glass 405. Specifically, the chip includes firmware which compares present images detected by the pixels 215 of the sensor array 210 with images taken at a previous time, and the difference reveals the relative motion of the finger 400 to the cover glass 405. An example of this comparative analysis is found in U.S. Pat. No. 5,644,139, the disclosure which is incorporated by reference. The resulting output is output to move a cursor on the display 130.

Figure 2A:
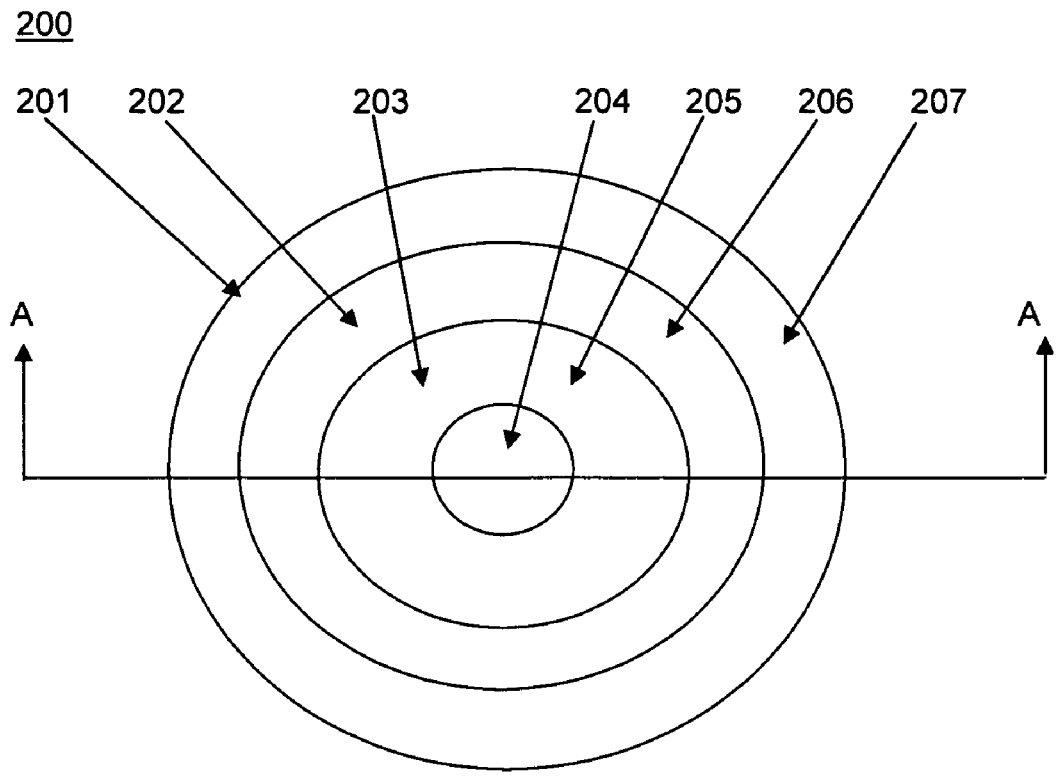
FIG. 2A is a top view of a microlens array shown in FIG. 1
Figure 2B:
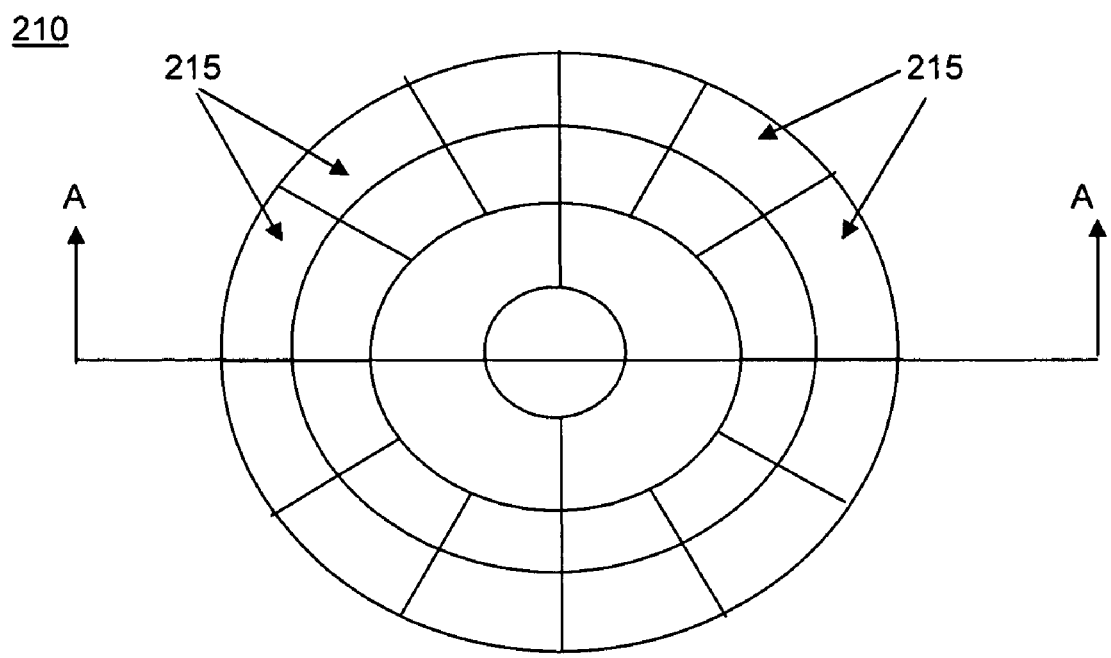
FIG. 2B is a top view of a sensor array according to an aspect of the invention.

While existing optical navigation devices use a single objective lens to focus an image onto a sensor as a single image, as shown in FIGS. 2A and 4, the microlens array 200 (alternately referred to as a flat lens array) has a plurality of lenslets 201, 202, 203, 204, 205, 206, 207. Each lenslet 201, 202, 203, 204, 205, 206, 207 focuses individual images onto corresponding pixels 510, 520, 530, 540, 550, 560, 570 of the sensor array 210. This allows the lens array 200 to be placed closer to the cover glass 405, thereby reducing the form factor (i.e., physical size) of the overall optical navigation device 140. As shown in FIG. 4, the microlens array 200 is designed to be close to the sensor array 210. While not required in all aspects, the microlens array 200 can be layered on and/or bonded to the sensor array 210 so as to further decrease the form factor.

Figure 3:
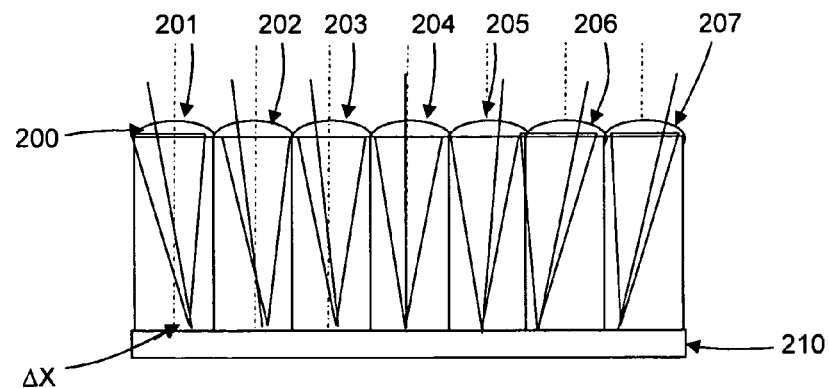
FIG. 3 is a cross section across section A-A of the microlens and sensor arrays of FIGS. 2A and 2B and showing an offset between lenslets and the corresponding pixels according to an aspect of the invention.
Figure 4:
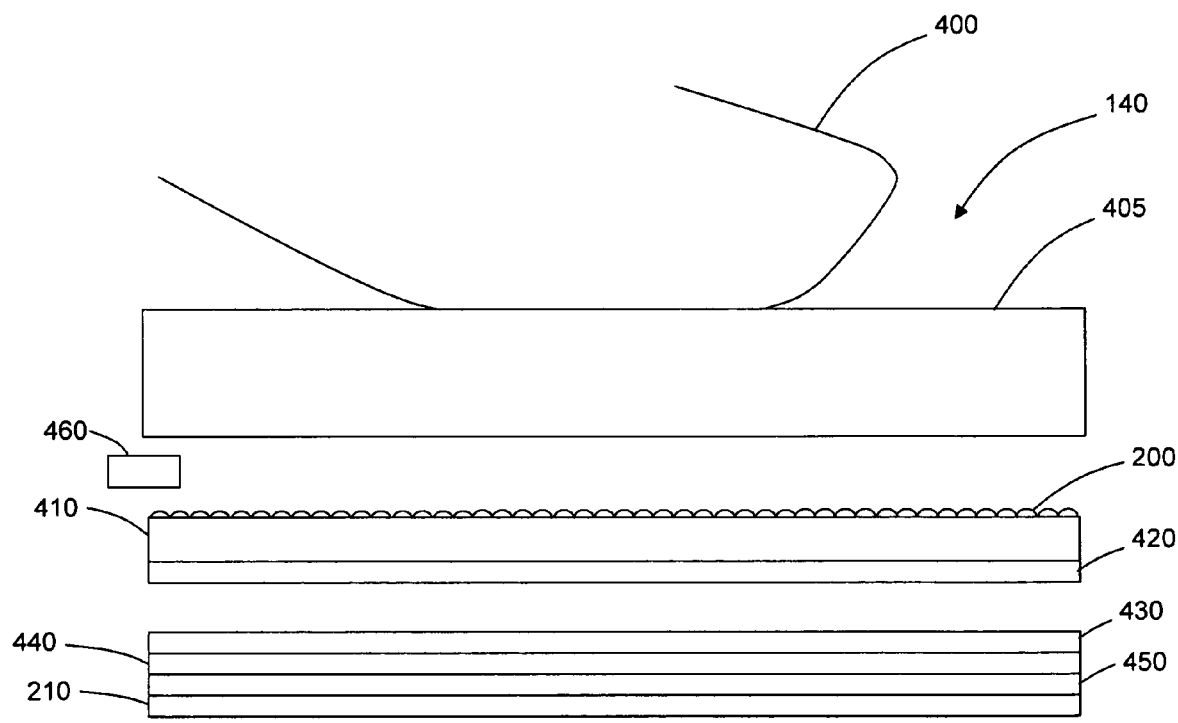
FIG. 4 is an example of the optical navigation module of FIG. 1 using a set of Apertures according to an aspect of the invention.

FIG. 3 shows an embodiment of the invention in which the microlens array 200 includes lenslets 201 through 207. As can be seen in FIG. 3, light entering each lenslet is focused at a different angle, and therefore has an offset $\Delta x$ when reaching the sensor array 210. The offset $\Delta x$ of each lenslet varies according to a distance from a center of the microlens array 200. Specifically, the lenslet 204 has substantially no offset $\Delta x$ and images along a center line. In contrast, lenslets 203, 205 have an increased offset $\Delta x$, lenslets 202, 206 have a larger offset, and lenslets 201, 207 have the largest offset $\Delta x$ of the shown microlens array 200. Using these offsets $\Delta x$, the microlens array 200 steers each image to a corresponding location chosen to reduce or prevent cross talk between adjacent pixels 510, 520, 530, 540, 550, 560, 570. In this manner, the light is received radially. However, it is understood that the offset can increase or decrease according to other factors beyond distance from a center or edge, and need not be used for all of the lenslets of a particular array.

Moreover, it is understood that, while shown in FIG. 3, there need not be offsets in all aspects of the invention. Specifically, for small distances between the cover glass 405 and the microlens array 200, there is less overlap between images formed by the microlens array 200. Thus, a distance between the glass 405 and the microlens array 200 of roughly 1 millimeter, there would not be appreciable overlap and offset would not be needed. In contrast, where the distance between the glass 405 and the microlens array 200 is 3 millimeters, there would be image overlap and some mechanism, such as an offset or an aperture, is more desirable to use in order to improve performance. The distance at which overlap occurs can be other than 3 millimeters depending on the design of the microlens array 200.

While many different shapes of the microlens array 200 are possible, FIG. 2A shows a circular embodiment of the microlens array 200 in which the lenses 201, 202, 203, 204, 205, 206, 207 shown in FIGS. 2A and 3 correspond to concentric circles. In this manner, light is received radially as shown in FIG. 3.

However, it is understood that the microlens array 200 can also be rectilinear or other shapes according to aspects of the invention. In this embodiment, the sensor array 210 has a corresponding rectilinear shape and receives light normally to the microlens array 200, and the lenslets 201-207 extend in parallel to the pixels 215. Moreover, the size of the sensor array 210 is substantially the size of the object field of the microlens array 200 and/or to a size of the finger 400 tip contacting the cover glass 405. However, it is understood that the light need not be received normally in all aspects of this embodiment, such as when the light is imaged at a common angle to the pixels 215, and that the sensor array 210 can have dimensions relative to the microlens array 200 and/or the object field.

While the use in existing optical navigation modules is possible if the cover glass 405 is a few tens of centimeters from the microlens array 200, the microlens array 200 allows for smaller distances on the order of a few millimeters. As such, the microlens array 200 allows for a small form factor, which is suitable for handheld devices such as the phone of FIG. 1. Preferably, for a small form factor and to reduce optical cross talk, the distance from the microlens array 200 to the cover glass 405 is less than three millimeters.

Moreover, whereas existing uses of lens arrays, such as that shown in PCT Publication WO 00/64146 in FIGS. 1 and 2A as well as lenticular lenses exist and are usable in aspects of the present invention, these existing lens arrays require extensive effort to prevent ghosting and cross-over of the images, which makes these lens arrays less desirable for use even for human consumption. By way of example, the lens array of PCT Publication WO 00/64146 requires the use of a specific offset in order to produce an image suitable for a camera. In contrast, the microlens array 200 according to aspects of the present invention is used for optical navigation and does not need such a precise image and can have a simpler design. Further the microlens array 200 has a nearly zero angle field of view, and is thus able to image a larger total field of view. This ability simplifies the alignment of the lenslets with any aperture array so as to reduce fabrication costs.

While not required in all aspects of the invention, the microlens array 200 has a thickness in a range between a few microns to a few hundred microns thick. According to an aspect of the invention, the diameter of each lenslet 201 through 207 is on the order of 5 to 200 microns, and a height of the microlens array 200 is in a range at or between 5 to 500 microns. As such, light from a small area of the lens array 200 (such as a 100 micron by 100 micron area) is directed to a corresponding pixel 215 of the sensor array 210.

Additionally, while the microlens array 200 can be separately attached and/or have a layer between the array 200 and the sensor array 210, the microlens array 200 may be bonded directly to the sensor array 210 according to an aspect of the invention. Such direct bonding would allow for reduced fabrication cost, greater ease in pixel-lenslet alignment, and a lower form factor as compared to conventional lenses. Any aperture set(s) could be disposed as layers in such a construction which further facilitates an alignment of pixels and the aperture set openings. The microlens array 200 can be fabricated using any optical material normally used for lenses. By way of example, glass, plastic or a plastic photoresist may be used according to an aspect of the invention.

According to an aspect of the invention, the photoresist is used at a wafer level scale by forming the lenses 201 through 207 through a resist reflow process. In the resist reflow process, the resist is placed on a wafer, the resist is lithographically patterned to correspond to the pixel layout, and then heat is generated in order to reflow the resist to form the individual lenses 201 through 207 through surface tension. Alternately, the photoresist or other optical material can be formed into the microlens array 200 through processes such as injection molding, preferably at wafer level.

While seven lenslets 201 through 207 are shown in FIGS. 2A and 3 for simplicity, it is understood that additional lenslets and detectors often will be needed. Specifically, for a one lenslet per pixel embodiment, there may be between 10×10 or 30×30 pixels in an array according to aspects of the invention. As such, a corresponding number of lenslets would be used. However, it is understood that for other applications, the pixel array of the sensor array 210 can be between 50 to 2,000 pixels. As such, a corresponding number of lenslets would be needed for the microlens array 200. Moreover, while a one-to-one pixel to lenslet arrangement is described, it is understood that other ratios can be used in other aspects of the invention. While shown as focusing light along the centerline, it is understood that each lenslet could focus light at a same angle according to another aspect of the invention.

Preferably, the field of view for each lenslet is restricted in order to prevent overlap and ghost images. Overlap and ghosting occur due to optical cross talk when light from a lenslet forms an image on or contacts an unintended pixel. According to an aspect of the invention, the field of view of each lenslet is reduced by reducing a distance between the glass 405 and the microlens array 200. Essentially, the greater the distance, the greater likelihood of overlap. Thus, the field of view of each lenslet is directed at a small angle so that the field of view of one lens does not overlap substantially with a field of view of an adjacent lenslet. As such, offsets need not be used in all aspects of the invention to prevent cross talk.

While not required in all aspects, the effective field of view can be reduced and better controlled through blocking of the light focused by each image using an aperture array. The aperture array can include single or multiple opaque layers with apertures therein according to aspects of the invention. By creating the aperture array, the ghosting and cross talk can be reduced by blocking light causing the ghosting. Moreover, since the existence of ghost images is not fatal in the context of optical navigation and depending on the use of offset and the distance between the flat lens array 200 and the sensor array 210, the use of the aperture array need not be used in all aspects of the invention.

An example of the relationship between the lens array 200, an aperture array, and the sensor array 210 is shown in FIG. 4. As shown, the finger 400 contacts the cover glass 405 and moves relative to the cover glass 405. The finger 400 is illuminated by a light source 460. Light reflected from the finger 400 passes through the cover glass 405 and is imaged by the microlens array 200. The microlens array 200 is disposed on one side of a glass 410. On the other side of the glass 410 is disposed a first aperture set 420. Light imaged by the lens array 200 passes through the glass 410 and is at least partially blocked by the first aperture set 420. The remaining light which passed through the apertures of the first aperture set 420 sequentially passes through apertures of a second aperture set 430, a second piece of glass 440, and apertures of a third aperture set 450 prior to being received at the sensor array 210. While not required in all aspects, the third aperture set 450 is in contact with the sensor array 210.

In the shown example, the optical navigation device 140 has a diameter of roughly 3 mm. The cover glass 405 has a thickness of 0.5 mm. The distance between the bottom of the cover glass 405 and the flat lens array 200 is 0.3 mm. Moreover, the distance between the microlens array 200 and the sensor array 210 is 0.25 mm, thereby making the device 140 only 1.05 mm thick. However, it is understood that other arrangements and thicknesses can be used. For instance, in order to allow the average fingertip to navigate, the diameter of the glass 405 would be on the order of 10 to 30 mm.

Figure 5:
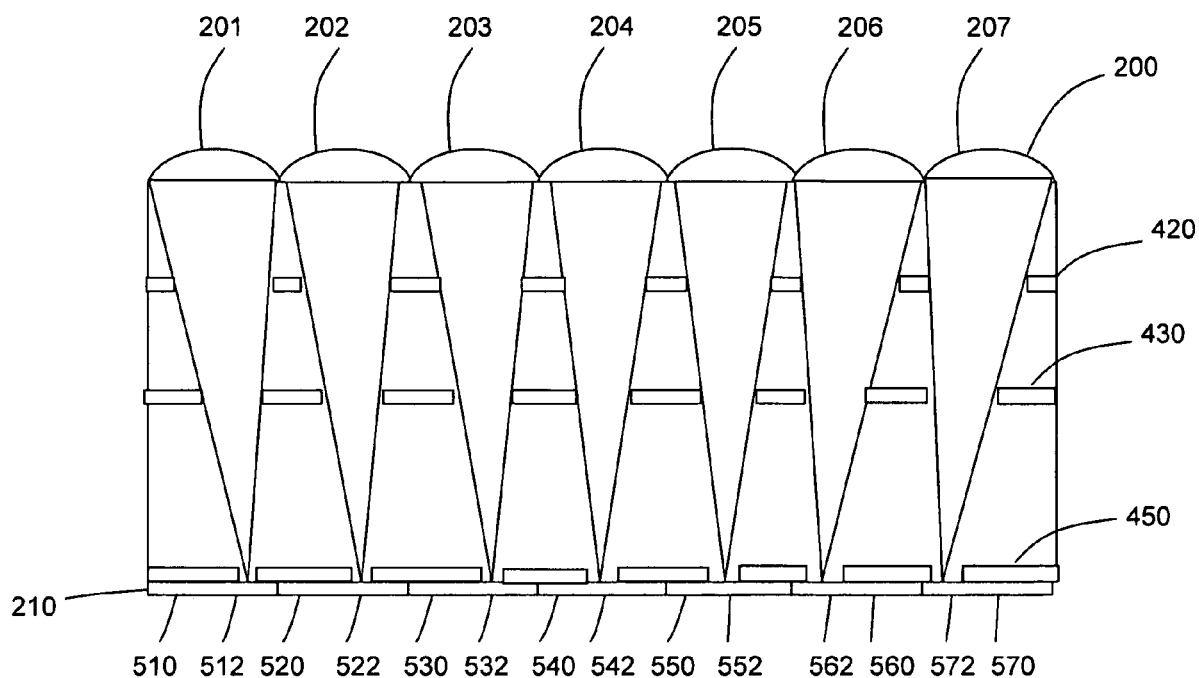
FIG. 5 is an example of the microlens array of FIG. 4 showing the apertures and an offset according to an aspect of the invention.

As shown in greater detail in FIG. 5, three sets of apertures 420, 430, and 450 are shown. The aperture sets 420, 430, 450 provide a restricted field of view so as to effectively block light from being received at the sensor array 210 except at image points 512, 522, 532, 542, 552, 562, 572 on corresponding sensor pixels 510, 520, 530, 540, 550, 560, 570. The number of aperture sets can be other than the three sets shown in the embodiment in FIGS. 4 and 5 according to other aspects of the invention. For instance, a single aperture set is suitable in some implementations, such as where a controlled illumination field is used and/or a distance between the microlens array 200 and the sensor array 215 is small. Thus, the use and number of aperture sets is dependent on the orientation of the various elements relative to each other.

By way of example, assuming the cover glass 405 is at least 20 to 30 mm across, and a sensor array 210 is 10 mm across, the light received at the sensor array 210 at about a 40 to 45 degree angle. As such there is an increased risk of cross-talk and a need to improve the image in order to reduce this cross-talk such that an aperture array might be used. The greater the number of aperture sets, the more likely that the cross-talk will be reduced so as to improve optical navigation.

An example of the improvement is readily seen in the simulation shown in FIG. 6. FIG. 6 shows the result of a computer simulation in which aperture sets 420, 430, 450 were exposed to light from an extreme left of the cover glass 405. The measured amount on the x axis relates to a normalized amount of light flux for light imaged by the left most lenslet of the flat lens array 200 and received at positions on the sensor plane corresponding to the positions of pixels 215.

The leftmost lenslet is designed to correspond with the leftmost position such that ghosting occurs for light received at the remaining positions to the right of the leftmost position. Each of the apertures of the aperture set 420 had a diameter of 50 μm, each of the apertures of the aperture set 430 had a diameter of 30 μm, and each of the apertures of the aperture set 450 had a diameter of 5 μm.

According to the shown computer simulation, for light originating at the extreme left of the cover glass 405 which passed through the leftmost lenslet, very little of the light received at pixel locations other than the corresponding leftmost pixel position (i.e., the location corresponding to the left most lenslet). The shown amounts are normalized by the light received at the corresponding leftmost pixel location, which is denoted with a 100%. In contrast, for the adjacent pixel position, at most 1.2% of the light from the leftmost lenslet is received at the adjacent pixel position. As such, the use of multiple aperture sets reduces optical cross-talk so as to improve the contrast and the optical navigation. However, it is understood that other sizes of the apertures and/or distances can be determined according to other aspects of the invention.

According to an aspect of the invention, in order to further prevent ghosting and other effects caused by optical cross-talk, a controlled illumination field matching the imaging field of the microlens array 200 is used to reduce cross-talk. As such, where a controlled illumination field is provided, the apertures are not needed, but still are preferable. However, if ambient light is used for illumination, the apertures is preferred since there is more likely to be ghosting and optical cross-talk where the illumination field is variable.

The light source 460 can used in order to provide an illumination field sufficient to illuminate the finger 400 as shown in FIG. 4. As such, according to an aspect of the invention, the microlens array 200 would have a field of view matching the illumination field provided by the light source 460. Examples of such light sources 460 include an LED, a laser, or other like light emitting device. According to an aspect of the invention, where the light source 460 is the laser, the laser produces interference patterns due to features of the surface such that the formed image is of the interference patterns imaged by the microlens array 200 to detect motion.

However, it is understood that ambient light can be used in addition to the light source 460 or instead of the light source 460 according to an aspect of the invention. Moreover, light used to generate the display 130 might also be sufficient in other aspects.

Additionally, while shown in FIG. 4 as being separate from the sensor array 210, it is understood that the light source 460 can be integrated with the sensor array 210 in order to further reduce the form factor and the thickness of the optical navigation device. Such integration can be performed using semiconductor and/or lithography techniques. Examples of such integrated light sources 460 and sensor arrays 210 are shown in FIGS. 7A through 9.

Figure 7A:
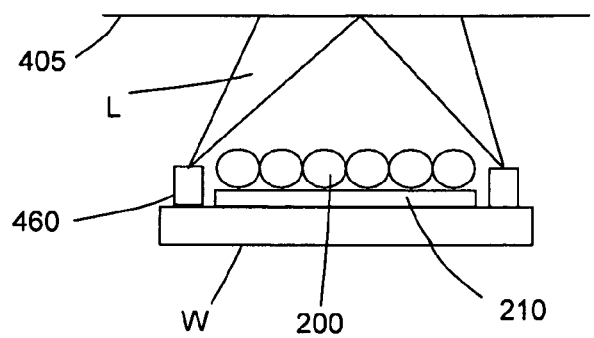
FIGS. 7A and 7B shown an example of a light source integrated on a periphery of the sensor according to an aspect of the invention.
Figure 7B:
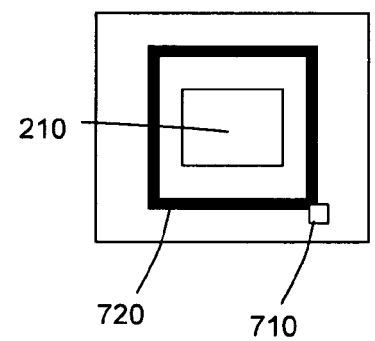

FIG. 7A shows a cross sectional view of the integrated light source shown in FIG. 7B. As shown in FIGS. 7A and 7B, the light source 460 is included on a wafer W holding the sensor array 210 and the microlens array 200. The light source 460 outputs light L to cover glass 405 and includes a light input 710 and a light guide 720. The light input 710 emits light into the light guide 720, which is disposed on a periphery of the sensor array 210. In this manner, the light guide 720 and light input 710 are disposed in an area normally used for circuitry and not required for receiving images. The light input 710 can be an LED or laser according to an aspect of the invention, but could also be light supplied from the display 130. The light guide 720 guides the input light to illuminate the cover glass 405. It is understood that, while only one light input 710 is shown and is disposed at a corner of the light guide 720, multiple light inputs can be used and/or can be otherwise located.

Figure 8A:
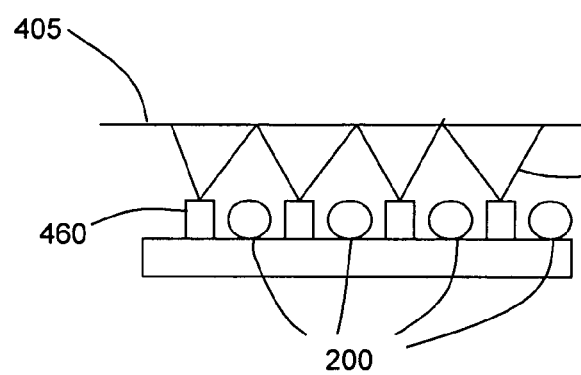
FIGS. 8A and 8B shown an example of a light source integrated on between pixels of the sensor according to an aspect of the invention.
Figure 8B:
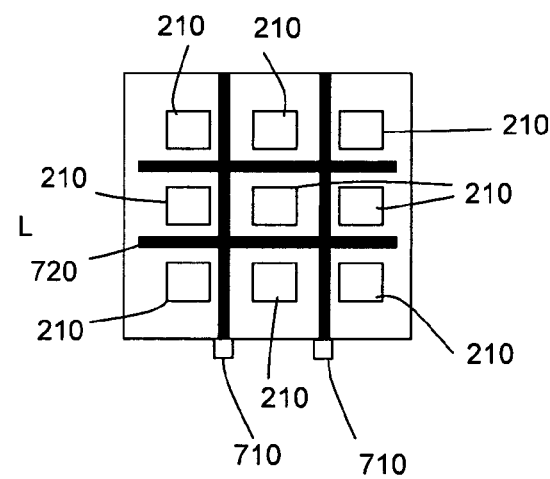

Alternately, as shown in FIGS. 8A and 8B, the light source 460 can be between pixels of the sensor array 210 according to an aspect of the invention. FIG. 8A shows a cross sectional view of the integrated light source shown in FIG. 8B. Specifically, the light inputs 710 input light into the light guide 720. The light guide 720 is shaped as a cross hatched matrix so as to emit light L between the lenslets-pixel pairs. While shown as being between discrete lenslets of the flat lens array 200 so as to emit light L between the lenslets, it is understood that the light guide 720, could instead send light at least partially through the lenslets. Further, it is understood that the light guide 720 can have other shapes, need not form a cross hatch pattern, and need not pass between each adjacent pair of pixels as shown.

Figure 9:
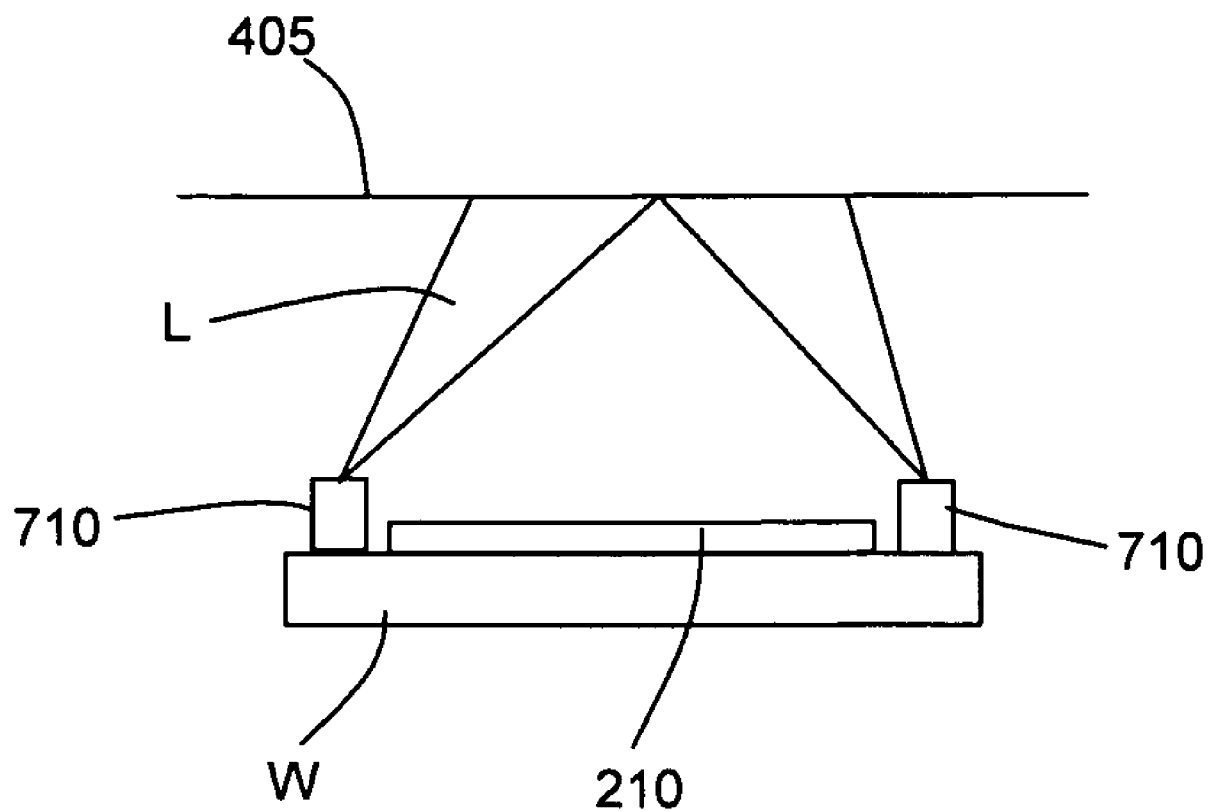
FIG. 9 shows an example of a light source not using a light guide according to an aspect of the invention.

FIG. 9 shows an example of an integrated light source 460 not using a light guide according to an aspect of the invention. Specifically, in FIG. 9, only light inputs 710 are used. However, the use of the light guides 720 allows the light L to be emitted from a point closer to the cover glass 405 as compared to the examples shown in FIGS. 4 and 9.

While shown in FIGS. 7A through 9 as using separate light input 710 and light guides 720, it is understood that the shown patterns can be replaced with light emitting layers, such as those used in organic electroluminescent displays (OELDs) and organic light-emitting diodes (OLEDs). In this manner, strips of light emitting material can be deposited between pixels and/or around pixels to provide the light without increasing a distance between the microlens array 200 and the cover glass 405 and/or increasing a form factor of the phone 410 or other like optical navigation modules.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable device comprising:
   a display on which information and/or images are displayed;
   a transparent surface;
   a lens array forming a corresponding image of an object using light received through the transparent surface;
   a light sensor comprising a plurality of pixels to detect the formed image of the object;
   a controller to use the detected image to determine a motion of the object relative to the transparent surface, and to navigate a cursor and/or a menu on the display according to the determined motion; and
   an aperture array between the lens array and the light sensor which selectively blocks portions of the light to prevent the portions from being received at non-selected pixels, wherein the aperture array comprises at least two sets of apertures, a first set of apertures being located at a first distance away from the light sensor and the second set of apertures being located at a second distance away from the light sensor, the first distance being different from the second distance such that light passes sequentially through the first set of apertures and then the second set of apertures.

2. The portable device of claim 1, further comprising a housing on which the display and the transparent surface are mounted and having a cavity housing the one or more lenses, the light sensor, and the controller.

3. The portable device of claim 2, wherein the portable device comprises a handheld device, and the housing is shaped to be held in one hand.

4. The portable device of claim 1, wherein the object is a fingertip, and the detected motion corresponds to a motion of the fingertip relative to the transparent surface.

5. The portable device of claim 1, wherein each portion of the one or more lenses corresponds to one of the pixels and directs a portion of the image to the one corresponding pixel, and the portable device further comprises an aperture array between the one or more lenses and the light sensor which selectively blocks portions of the light to prevent the portions from being received at non-corresponding pixels while allowing the remaining portions to be received at the corresponding pixels.

6. The portable device of claim 5, wherein a distance between the transparent surface and the sensor is substantially 1 mm.

7. The portable device of claim 1, further comprising a light source which emits a light at the object which is used by the light sensor to detect the formed image of the object.

8. The portable device of claim 7, wherein the light source comprises a light emitting diode.

9. The portable device of claim 7, wherein the light source comprises a laser which produces an interference pattern using the object to produce the image of the object.

10. The portable device of claim 1 further comprising a third set of apertures located a third distance away from the light sensor, the third set of apertures being in contact with the light sensor.

11. A portable device for use with a display on which information and/or images are displayed, the portable device comprising:
 a wafer;
 a light source;
 a light guide configured to receive light from the light source and disposed on the wafer in an area not required for receiving images;
 a transparent surface;
 a microlens array comprising a plurality of lenslets, each lenslet forming a corresponding image of an object using light generated from the light source, output from the light guide, and received through the transparent surface;
 a light sensor comprising a plurality of pixels, each pixel corresponding uniquely to one of the plurality of lenslets, to detect the formed images of the object; and
 a controller to use the detected images to determine a motion of the object relative to the transparent surface, and to output the detected motion to the display for use in navigating a cursor and/or a menu on the display according to the determined motion.

12. The portable device of claim 11, wherein the portable device is external to the display.

13. The portable device of claim 11, wherein the sensor is disposed substantially 1 mm from the transparent surface.

14. The portable device of claim 11, wherein the microlens array is directly bonded to the light sensor according to a resist reflow process or injection molding process.

15. The portable device of claim 11, wherein the microlens array further comprises an aperture system which blocks portions of light from non-corresponding lenslets so as to prevent the portions from being received on a same pixel.

16. The portable device of claim 11, wherein each lenslet forms the corresponding image of the surface on the corresponding pixel at a corresponding offset from a centerline of the lenslet, and an amount of the offset varies as a function of distance from an edge of the light sensor.

17. The portable device of claim 11, wherein each lenslet has a diameter, the diameter is in a range at or between 5 to 200 microns, and a height of the microlens array is in a range at or between 5 to 500 microns.

18. The portable device of claim 11, wherein each lenslet corresponds to one of the pixels, and a number of pixels of the light sensor is in a range at or between 50 to 2,000 pixels.

19. The portable device of claim 11, wherein the portable device comprises a telephone having the display.

20. The portable device of claim 11, wherein the light sensor is a circular light sensor having pixels that correspond to concentric lenslets.

* * * * *